July 19, 1966 G. R. GRAHAM ETAL 3,261,440
BRAKE AND CLUTCH ASSEMBLY
Filed July 6, 1964
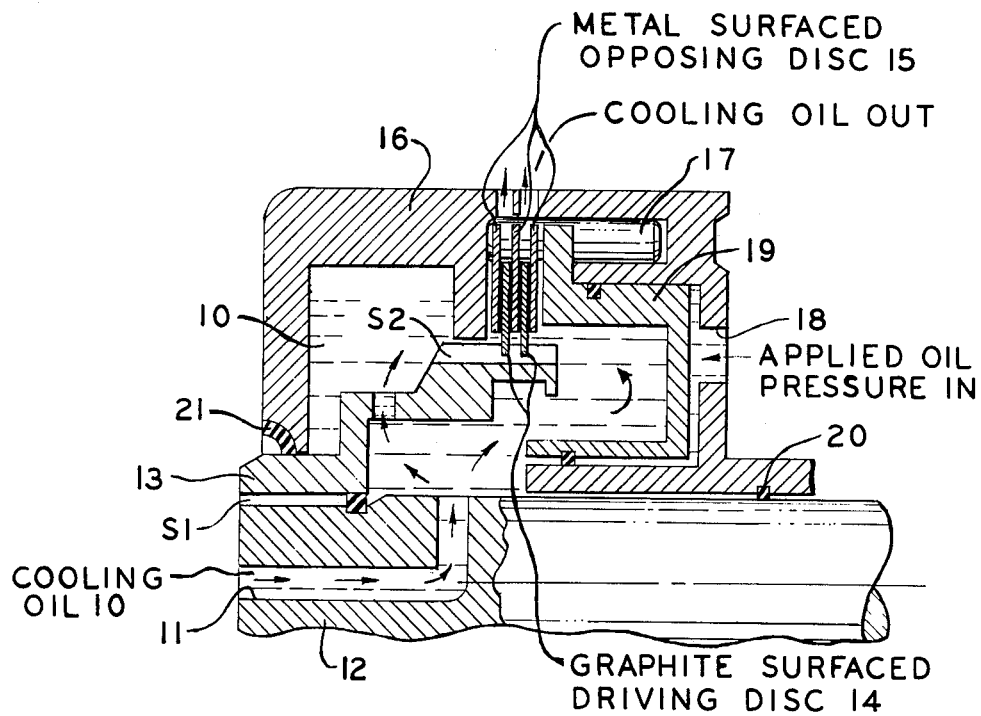
GLENN R. GRAHAM
ARTHUR C. ECHLER
JACOB NITZ
INVENTORS
BY
Richard MacCutcheon
ATTORNEY

United States Patent Office 3,261,440
Patented July 19, 1966

3,261,440
BRAKE AND CLUTCH ASSEMBLY
Glenn R. Graham, Hovelty, Arthur C. Echler, North Royalton, and Jacob Nitz, Bedford, Ohio, assignors to American Brake Shoe Company, New York, N.Y., a corporation of Delaware
Filed July 6, 1964, Ser. No. 380,201
4 Claims. (Cl. 192—113)

This invention relates to clutch and brake assemblies in which a friction facing material engages an opposing surface material and one or both of the materials move in oil, and (preferably) oil is force circulated around and generally between the two materials whereby to cool the same.

In oil cooled clutches, brakes and automatic transmissions as known in the past, a so-called opposing surface is of solid metal and mechanical arrangements are made to have it selectively engaged and disengaged by a so-called friction material which, heretofore, has been predominantly asbestos, or else predominantly of metal, or, in some cases, entirely of a cellulose like material such as paper or cork. All have had advantages and disadvantages well known in the art, but current technology has not been completely successful for the heavier duty applications as in large off-the-highway and construction vehicles in which conventional non-metallic friction facings decompose and char, due to heating, even when run in cooling oil, and conventional predominantly metallic friction facings score, and weld and seize (to opposing surface) due to heating, even when run in cooling oil, so that in either event there is imposed a short wear life or a low torque capacity because of limits beyond which any practical sort of cooling becomes inefficient and ineffective.

An object of the present invention is to provide simple and inexpensive means for overcoming the above difficulties.

Another object is to provide a friction assembly having a friction facing characterized by superior compatibility while running in oil with conventional opposing surface material such as steel, superior relation of static to dynamic coefficient of friction, superior heat resistance, and superior facing (and opposing surface) durability, all to the end of greatly improving the capacity of the clutch, brake, or transmission assembly.

A further object is to provide, for friction assemblies, soft shift characteristics, elimination or minimizing of dynamic coefficient of friction decay (progressive reduction over a series of engagements, for example of torque output of a clutch), elimination of decomposition or welding or seizing, and increased durability and capacity.

A still further object is to provide a wet (the art name for an oil cooled) clutch with reduced oil flow requirements, whereby to reduce the complexity of seals and to reduce engine horsepower required for pumping of cooling oil.

Other objects and advantages will become apparent and the invention may be better understood from consideration of the following description of several embodiments.

According to one aspect of the invention a clutch, brake or transmission facing is primarily graphite. It may be made of powdered graphite having a binder, for example, a furfural resin or a phenol formaldehyde resin, or any thermosetting resin, or the binder may be a non-resin such as pitch, or there may be no final binder, as hereafter described for the case where an original binder has itself been carbonized or graphited. The facing runs in oil in which it is adapted to engage an opposing surface. Instead of using the graphitic allotropic form of carbon, the amorphous allotrope may be used, petroleum coke, lamp black, charcoal, coal flour, and the like being suitable. Except that it has an absence of conventional predominant material (e.g., metal and/or asbestos), a friction facing for an oil cooled assembly according to the present invention, e.g., a resin and carbon mix, can be manufactured (mixed, pressed and heated) as disclosed in expired U.S. Patent No. 2,110,571 issued to Elerath, or expired U.S. Patent No. 2,369,502 issued to Walker.

Good results have been obtained using a mix of:

78% by weight artificial graphite, and
22% by weight furfuryl resin.

Alternatively, instead of attempting to fashion a friction facing by compounding discrete particles of non-crystalline carbon and resin, an all carbonaceous material (intended for arc rods or other electric uses) may be purchased in block form from any of several companies, it being supposed that it was made by using a resin or other carbonizing binder originally, but that there then followed a high temperature step which carbonized or graphitized the original binder.

Conventionally the "facing" material is affixed (for example by using same, or other, resin as an adhesive) to a solid metal backing plate. In conventional "wet clutch" applications cooling oil is forced between rubbing surfaces and there is a plurality of discs alternately completely of steel and of steel with friction facings which according to the present invention improvement are predominantly of carbon, one set serving as driving members and the other as driven members. Brakes use the same construction (one set, or disc or shoe being stationary, while the other set, or disc or drum is relatively rotatable). As a matter of fact, however, there is little difference between a clutch and a brake, and the term "clutch" can be considered to be generic to both, and it is in this generic sense that the word "clutch" is used in claim 2 hereinafter and even, ofttimes, in the art, a so-called "clutch" in an automatic transmission serving to stop rotation of a shaft, whereby the transmission automatically changes to another gear ratio. In any event, there is a friction assembly and means for selectively engaging and disengaging the friction material and the opposing surface material. The subsequent reduced relative movement of the principal parts is due primarily to shearing of a thin oil film which provides a very desirable way of transferring kinetic into thermal energy and of dissipating the latter, even though the oil film is probably ultimately broken so that surface to surface contact between the two principal members is probably the final result as the relative speed of these members approaches zero. But, even though much of the energy dissipated during the total step of engagement is due to the shearing of a thin (e.g., a few molecules thick) film of cooling oil, it is probably the built in porosity of the predominantly carbonaceous facing which maintains the oil film long enough to provide our improved advantages of smooth shift, minimal decay and freedom from fade (as hereafter defined) as well as freedom from galling, seizure and char.

We are aware that articles which are all or predominantly of graphite, coal, or other from of carbon, have been known in the past for friction uses. For the most part, these prior uses amount to abandoned experiments since in modern day technology brake or clutch or transmission friction facing composed of or predominantly of elemental carbon has seemed impractical, the desirability of the present improvement has been hidden because testing for new materials is usually done first in air. When running in air, an all, or predominantly, graphitic or otherwise carbonaceous friction facing is characterized by wear and/or very high fade (decrease of coefficient of friction from the beginning to just before the end of a stop). By contrast, we find that by immersing the same material in oil, preferably force circulated, we either eliminate catastrophic wear (which would occur in a dry air ambient) or eliminate the high fade (which would occur in an air ambient of normal humidity), or both. Also the present improvement has not seemed obvious because non-crystalline carbon, and graphite particularly, has been known as a lubricant, the fade just mentioned probably being due to lubricant action of the smearing of graphite over the opposing surface material (when operating in air). By contrast, we have found that elemental carbon facing material, other than in the diamond form, may have a porosity so that, when running in oil (an ordinary transmission lubricating oil being suitable), not only does the oil, preferably force circulated, do most of the work, and absorb the heat, of braking or clutching, but also the oil serves to flush away the relatively small amount of loosened graphite wear particles and prevent them from either closing the pores or smearing onto the opposing surface metal. Thus it is our theory that the high "fade" characteristic, which was such a disadvantage when the same parts were run in air of normal humidity, is eliminated.

Porosity, e.g., in a mix predominantly graphite, and which porosity for our purposes is preferably an interconnecting porosity and permeability, can, as is well known, be readily controlled by attention to such things as particle size, nature of resin or other binder, time and temperature and pressure during compacting and curing.

In the appended drawing the single figure shows a portion of a multiple disc type clutch incorporating the invention.

In the drawing cooling oil 10 is introduced under relatively constant pressure as through a port 11 in the center of a driving shaft 12 for ultimately forcing oil between friction producing surfaces. A driving member 13 is in splined engagement through splines S1 with shaft 12. Other splines S2 couple driving member 13 with a driving set of discs having friction producing surfaces. For the drawing arrangement it is assumed that the driving set consists of two discs 14 each comprising a steel backing plate having bonded thereto two friction producing surfaces of graphite. These cooperate with three opposing discs 15 which are assumed of steel throughout, hence having friction producing surfaces of steel. The opposing discs 15 engage a driven member 16 through a series of pins 17. In more or less conventional manner, oil under applied pressure may be introduced as through a port 18 for moving a piston part 19 to bring the friction producing surfaces into engagement with one another, and some means, such as a series of springs, not shown, is used for causing disengagement when the pressure of such oil is relieved. Conventional seals such as those shown at 20 and 21 may be used to prevent leakage of cooling oil and of applied pressure oil.

There is thus provided an assembly of the class described capable of meeting the objects above set forth, and characterized by low wear, both of friction facing and of opposing surface, improved friction characteristic including suitable coefficient of friction and suitably comparable static and dynamic coefficient of friction values (to provide soft shift from relative movement to relative non-movement), absence of "coning" (occupying of more space by either element after operation), minimized coefficient of friction fade, minimized coefficient of friction "decay", absence of burn, char, melt or seizure or scoring, relatively cool operation, relatively high torque capacity, and energy absorption rates exceeding those of prior oil cooled constructions of comparable size, and cooling oil requirements less than those of prior oil cooled constructions of comparable size.

While we have described particular embodiments, various modifications may obviously be made without departing from the true spirit and scope of the invention which we intend to have defined only by the appended claims taken with all reasonable equivalents.

We claim:
1. A friction assembly adaptable for low wear, comparable dynamic and static coefficient of friction values, absence of char, weld seizure, and scoring, and relatively cool operation, said assembly being of the type having means for selectively changing spacing between a friction facing material and an opposing surface material from a complete disengagement position to an engaged position, said assembly being the combination of:
   a cooling oil,
   said opposing surface material exposed to said cooling oil, and
   said friction facing material with said friction facing material having an interconnecting porosity and permeability and comprising more than 50% by weight elemental carbon exposed to said cooling oil.

2. A friction assembly as in claim 1 further characterized by the assembly being a multiple disc-type clutch comprising alternately arranged friction facings and opposing surfaces, said friction facings each having an interconnecting porosity and comprising more than 50% by weight elemental carbon exposed to the cooling oil, whereby to provide energy absorption rates exceeding those of prior constructions of comparable size.

3. A friction assembly as in claim 2 further characterized by the carbon being graphite.

4. A friction assembly as in claim 2 further characterized by the carbon being petroleum coke.

References Cited by the Examiner

UNITED STATES PATENTS

| | | |
|---|---|---|
| 1,820,711 | 8/1931 | Sargent. |
| 2,879,872 | 3/1959 | Van Ranst _____ 192—113 X |
| 2,954,853 | 10/1960 | Maierson et al. ____ 192—107 X |
| 3,048,250 | 8/1962 | Kershner. |
| 3,184,001 | 5/1965 | Reinsch et al. _____ 192—107 X |

DAVID J. WILLIAMOWSKY, Primary Examiner

DON A. WAITE, Examiner.

A. T. McKEON, Assistant Examiner.